United States Patent
Allen

(10) Patent No.: US 11,287,596 B2
(45) Date of Patent: Mar. 29, 2022

(54) METHODS, KITS, AND SYSTEMS INCORPORATING A SELF-AMALGAMATING TAPE FOR CLAMPING FIBER OPTIC CABLE

(71) Applicant: COMMSCOPE TECHNOLOGIES LLC, Hickory, NC (US)

(72) Inventor: Barry Wayne Allen, Siler City, NC (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 17/252,658

(22) PCT Filed: Jun. 13, 2019

(86) PCT No.: PCT/US2019/036945
§ 371 (c)(1),
(2) Date: Dec. 15, 2020

(87) PCT Pub. No.: WO2019/241502
PCT Pub. Date: Dec. 19, 2019

(65) Prior Publication Data
US 2021/0255412 A1    Aug. 19, 2021

Related U.S. Application Data

(60) Provisional application No. 62/685,330, filed on Jun. 15, 2018.

(51) Int. Cl.
*G02B 6/44* (2006.01)

(52) U.S. Cl.
CPC .......... *G02B 6/4477* (2013.01); *G02B 6/443* (2013.01); *G02B 6/4486* (2013.01); *G02B 6/4432* (2013.01); *G02B 6/4471* (2013.01)

(58) Field of Classification Search
CPC ... G02B 6/4432; G02B 6/4477; G02B 6/4486
See application file for complete search history.

(56) References Cited

U.S. PATENT DOCUMENTS

| 4,769,513 A | 9/1988 | Ragland et al. |
| 4,805,979 A * | 2/1989 | Bossard ............... G02B 6/4446 385/135 |

(Continued)

FOREIGN PATENT DOCUMENTS

| EP | 0 694 225 B1 | 3/1997 |
| JP | H09-5590 A * | 1/1997 |

(Continued)

OTHER PUBLICATIONS

Arlon, "Self-Fusing Silicone Tapes", 2010, WHX Corporation, pp. 1-3 (Year: 2010).*

(Continued)

*Primary Examiner* — Ryan A Lepisto
(74) *Attorney, Agent, or Firm* — Merchant & Gould P.C.

(57) ABSTRACT

Disclosed herein is a method including wrapping a self-amalgamating tape around a portion of a cable jacket of the fiber optic cable to provide a wrapped portion; and clamping the fiber optic cable at the wrapped portion with a clamp. Upon clamping, the self-amalgamating tape is between the clamp and the cable jacket and the clamp compresses the self-amalgamating tape.

21 Claims, 1 Drawing Sheet

(56) References Cited

U.S. PATENT DOCUMENTS

| | | | |
|---|---|---|---|
| 5,568,584 | A | 10/1996 | Smith |
| 5,793,920 | A * | 8/1998 | Wilkins ............... G02B 6/4446 |
| | | | 385/135 |
| 7,136,555 | B2 | 11/2006 | Theuerkorn et al. |
| 7,378,593 | B2 | 5/2008 | Bukovnik et al. |
| 8,981,224 | B2 | 3/2015 | Kehl et al. |
| 9,343,886 | B2 * | 5/2016 | Larson .................... F16L 5/00 |
| 9,971,120 | B2 * | 5/2018 | Rudenick ............. G02B 6/4471 |
| 10,218,160 | B1 * | 2/2019 | Snyder ................. H02G 3/0406 |
| 2007/0261880 | A1 | 11/2007 | Cox et al. |
| 2012/0177334 | A1 | 7/2012 | Holmberg et al. |
| 2012/0318933 | A1 * | 12/2012 | Kimbrell ............. G02B 6/4471 |
| | | | 248/56 |
| 2014/0079366 | A1 | 3/2014 | Rodriguez et al. |
| 2014/0270677 | A1 | 9/2014 | Sievers et al. |
| 2016/0033722 | A1 | 2/2016 | Ray |
| 2016/0033732 | A1 * | 2/2016 | Giraud ................. G02B 6/4455 |
| | | | 385/135 |
| 2016/0259142 | A1 * | 9/2016 | Shi ........................ G02B 6/4477 |
| 2017/0092391 | A1 * | 3/2017 | Forget .............. H01B 13/01263 |
| 2020/0064579 | A1 * | 2/2020 | Allen ................... G02B 6/4477 |

FOREIGN PATENT DOCUMENTS

| | | |
|---|---|---|
| JP | 3-098487 B2 | 10/2000 |
| KR | 20-2017-0001907 U | 5/2017 |

OTHER PUBLICATIONS

International Search Report and Written Opinion of the International Searching Authority for International Patent Application No. PCT/US2019/036945 dated Oct. 4, 2019, 8 pages.

Extended European Search Report for European Patent Application No. 19819278.3 dated Nov. 18, 2021, 8 pages.

* cited by examiner

METHODS, KITS, AND SYSTEMS INCORPORATING A SELF-AMALGAMATING TAPE FOR CLAMPING FIBER OPTIC CABLE

CROSS-REFERENCE TO RELATED APPLICATION

This application is a National Stage Application of PCT/US2019/036945, filed on Jun. 13, 2019, which claims the benefit of U.S. Patent Application Ser. No. 62/685,330, filed on Jun. 15, 2018, the disclosures of which are incorporated herein by reference in their entireties. To the extent appropriate, a claim of priority is made to each of the above disclosed applications.

TECHNICAL FIELD

The present disclosure relates generally to clamping a fiber optic cable.

BACKGROUND

Fiber optic cables typically include a jacket containing one or more optical fibers. Fiber optic cables can have a variety of shapes (e.g., round and flat) and diameters. Fiber optic cables also typically include reinforcing elements such as Aramid yarns or glass reinforced polymer rods that are positioned within or embedded within the cable jackets. Fiber optic cables may be buffered in which optical fibers are positioned within a buffer tube or unbuffered in which optical fibers are positioned within a passage defined by the jacket itself.

Several types of fiber optic cables have relatively thin jackets. Thin jacketed fiber optic cables include micro drop cables, micro sheath cables, and blown fiber cables.

Fiber optic cables are generally subject to clamping forces, for example, in enclosures. However, clamping exerts undsesirable strain on fiber optic cables. In particular, a clamp applies a radial or hoop force to the cable jacket to sustain an axial load which in turn applies tension to the optical fibers.

There is a need for improved clamping fiber optic cables including thin jacketed fiber optic cables.

SUMMARY

One aspect of the present disclosure relates to a method. The method comprises wrapping a self-amalgamating tape around a portion of a cable jacket of the fiber optic cable to provide a wrapped portion. The method further comprises clamping the fiber optic cable at the wrapped portion with a clamp. Upon clamping, the self-amalgamating tape is between the clamp and the cable jacket and the clamp compresses the self-amalgamating tape.

A further aspect of the present disclosure relates to a kit for anchoring a fiber optic cable. The kit comprises a strain relief bracket adapted to mount to a structure (e.g., enclosure) at a location and transfer axial load from the fiber optic cable to the structure; a clamp adapted to attach to the strain relief bracket; and a self-amalgamating tape.

Another aspect of the present disclosure relates to a system. The system comprises a structure (e.g., an enclosure) and a kit for anchoring a fiber optic cable. The kit comprises a strain relief bracket adapted to mount to the structure at a location and transfer axial load from the fiber optic cable to the structure; a clamp adapted to attach to the strain relief bracket; and a self-amalgamating tape.

DETAILED DESCRIPTION

Figure 1:
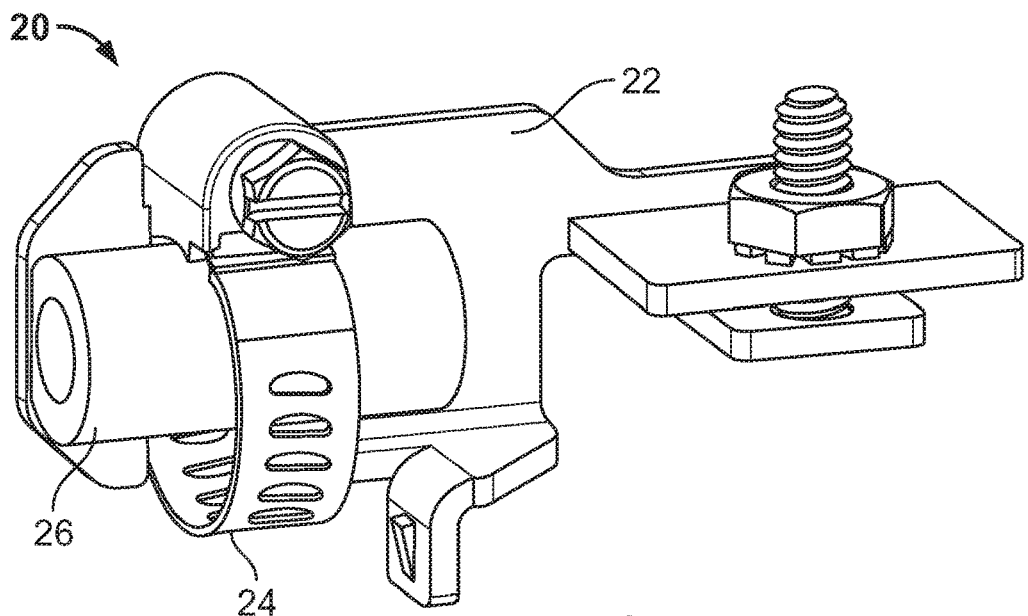
FIG. 1 shows components of an embodiment of a kit disclosed herein.

In the following detailed description, reference is made to the accompanying drawings showing by way of illustration a specific embodiment of a kit disclosed herein. It is to be understood that other embodiments may be utilized and structural or logical changes may be made without departing from the scope of the present disclosure. The following detailed description, therefore, is not to be taken in a limiting sense.

Aspects of the present disclosure relate to methods, systems, and kits for protecting a fiber optic cable upon clamping of a fiber optic cable. Aspects of the present disclosure further relate to methods, systems, and kits for clamping fiber optic cables of a range of diameters using a single size of clamp. Aspects of the present disclosure also relate to methods, systems, and kits that can provide strain relief to fiber optic cables and transfer axial load exerted by a clamp on a fiber optic cable to another structure (e.g., an enclosure). Additionally, aspects of the present disclosure relates to methods, systems, and kits that can provide such strain relief at higher temperatures (e.g., about 35° C. to about 70° C.).

The present disclosure provides a method including wrapping a self-amalgamating tape around a portion of a cable jacket of the fiber optic cable to provide a wrapped portion; and clamping the fiber optic cable at the wrapped portion with a clamp. Upon clamping the self-amalgamating tape is between the clamp and the cable jacket and the clamp compresses the self-amalgamating tape.

Self-amalgamating tape (also known as self-fusing tape) is known. Self-amalgamating tape unites or fuses with itself and can provide a strong and waterproof barrier. This lends to its general use in sealing applications.

The self-amalgamating tape can provide a protective barrier between the cable jacket of the fiber optic cable and the clamp. This is especially important for fiber optic cables having thin jackets including, for example, micro drop cables, micro sheath cables, and blown fiber cables. Thin jackets can be especially subject to damage including tearing, pinching, or punctures.

The method can further comprise attaching the clamp to a strain relief bracket prior to or following clamping the fiber optic cable. This permits transfer of axial load exerted by the clamp on the fiber optic cable to the bracket and/or another structure (e.g., an enclosure) even at higher temperatures. The clamp can be attached to the strain relief bracket by an interaction between the clamp and the strain relief bracket themselves (e.g., without a connecting structure) or, alternatively, by an attachment mechanism that connects the clamp and the strain relief bracket.

The self-amalgamating tape can be wrapped one or more times around the portion of the cable jacket. It is only required that the self-amalgamating tape contact itself at an area upon wrapping in order to fuse with itself and provide a layer or barrier between the portion of the cable jacket and the clamp. Generally, the self-amalgamating tape does not adhere to the cable jacket. Rather, the placement of the self-amalgamating tape is dependent upon adherence of the tape to itself.

The self-amalgamating tape can be wrapped upon itself several times in order to build up a surface between the cable jacket and the clamp advantageously permitting a single size clamp to be applied to a variety of sizes of fiber optic cables. For example, a single clamp can advantageously be used with fiber optic cables having a diameter from about 2 mm to about 26 mm, or from about 4 mm to about 20 mm.

Use of self-amalgamating tape as a barrier between a fiber optic cable jacket and a clamp is particularly useful when fiber optic cables are exposed to higher temperatures (e.g., about 35° C. to about 70° C.). Other types of tapes (e.g., felt and electrical tapes) incorporating pressure sensitive adhesive can be subject to failure at higher temperatures as the pressure sensitive adhesive is subject to poor performance at higher temperatures. Use of self-amalgamating tape as a barrier between a fiber optic cable jacket and a clamp is also useful when fiber optic cables are subjected to temperature cycling (e.g., between temperatures in a range of about −40° C. to about 70° C.). Use of self-amalgamating tape to protect cable jackets of fiber optic cables is also better than use of a heat shrink material which risks damaging the cable, especially thin jacketed cables, by application of heat.

FIG. 1 shows an embodiment of a kit 20 designed for clamping a fiber optic cable. As illustrated in FIG. 1, the kit 20 comprises a strain relief bracket 22, a clamp 24, and a self-amalgamating tape 26. The strain relief bracket 22 is adapted to mount to a structure (e.g., an enclosure) and transfer axial load from the fiber optic cable to the structure (e.g., enclosure). The clamp 24 is adapted to attach to the strain relief bracket 22.

Figure 2:
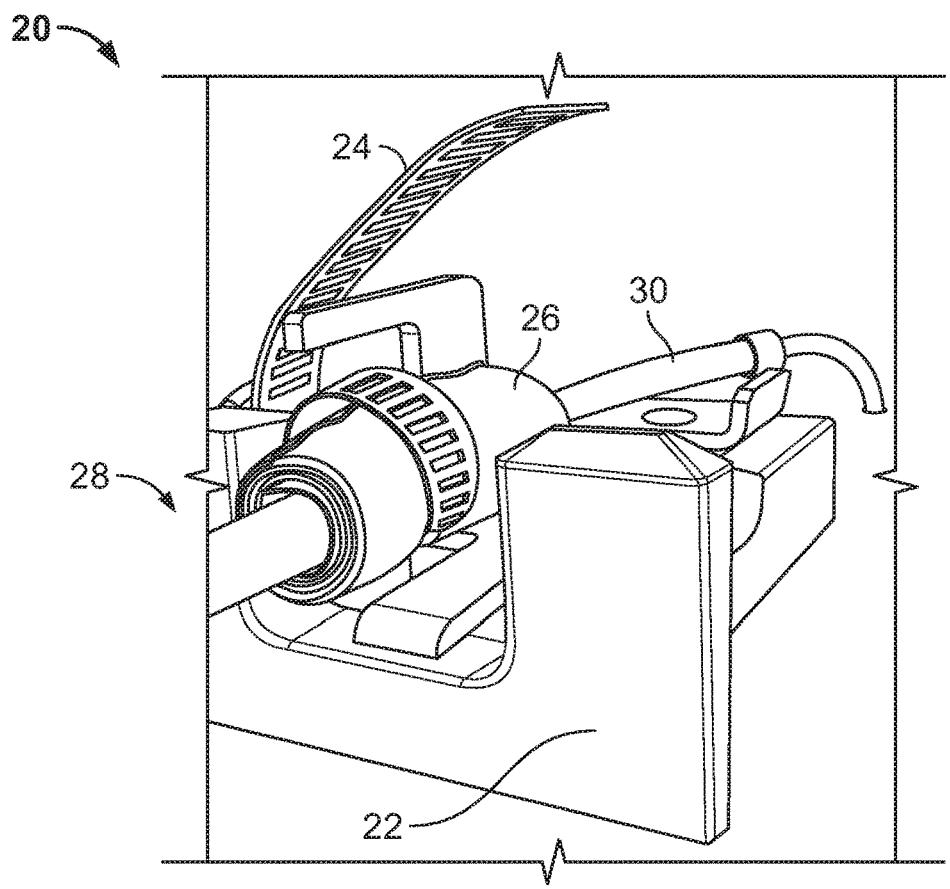
FIG. 2 illustrates a fiber optic cable clamped with an embodiment of a kit disclosed herein.

FIG. 2 illustrates the components of such a kit assembled to clamp a fiber optic cable. In use, the self-amalgamating tape 26 of the kit is wrapped around a portion of a cable jacket 30 of a fiber optic cable 28. Wrapping of the self-amalgamating tape 26 in this manner provides a wrapped portion of the fiber optic cable 28. The clamp 24 can then be used to clamp the fiber optic cable at the wrapped portion. Clamping may occur before or after attaching the clamp 24 to the strain relief bracket 22.

Systems incorporating a kit for anchoring a fiber optic cable are also disclosed herein. A system comprises a structure and a kit for anchoring a fiber optic cable. For example, a system comprises an enclosure and a kit for anchoring a fiber optic cable. The kit comprises a strain relief bracket adapted to mount to the structure at a location and transfer axial load from the fiber optic cable to the structure; a clamp adapted to attach to the strain relief bracket; and a self-amalgamating tape.

In embodiments, the self-amalgamating tape is a silicone tape.

In embodiments, the self-amalgamating tape is fiber-reinforced. In embodiments, the self-amalgamating tape is a tape impregnated with a mesh substrate. The mesh substrate can be, for example, fabric, fiberglass, metal, or polymeric. During wrapping, the mesh substrate advantageously resists, reduces, or prevents stretching of the self-amalgamating tape in a longitudinal direction.

In embodiments, the clamp is a radial clamp. In embodiments, the radial clamp is a circumferential clamp. In embodiments, the circumferential clamp is a hose clamp.

In embodiments, the cable jacket has a thickness from about 0.015 inches to about 0.125 inches. In embodiments, the fiber optic cable is a micro drop cable. In embodiments, the fiber optic cable is a micro sheath cable. In embodiments, the fiber optic cable is a blown fiber cable.

From the foregoing detailed description, it will be evident that modifications and variations can be made to the device disclosed herein without departing from the spirit or scope of the disclosure.

REFERENCE NUMERALS kit 20
strain relief bracket 22
clamp 24
self-amalgamating tape 26
fiber optic cable 28
cable jacket 30

What is claimed is:

1. A method, comprising:
   wrapping a self-amalgamating tape around a portion of a cable jacket of a fiber optic cable to provide a wrapped portion; and
   clamping the fiber optic cable at the wrapped portion with a clamp;
   wherein upon clamping, the self-amalgamating tape is between the clamp and the cable jacket to provide a mechanical buffer and the clamp compresses the self-amalgamating tape; and
   wherein the self-amalgamating tape is adapted for exposure to temperatures in a range of about −40° C. to about 70° C.

2. The method of claim 1, wherein the self-amalgamating tape is a silicone tape.

3. The method of claim 1, wherein the self-amalgamating tape is fiber-reinforced.

4. The method of claim 1, wherein the self-amalgamating tape is a tape impregnated with a mesh substrate.

5. The method of claim 1, wherein the clamp is a radial clamp.

6. The method of claim 5, wherein the radial clamp is a circumferential clamp.

7. The method of claim 6, wherein the circumferential clamp is a hose clamp.

8. The method of claim 1, wherein the cable jacket has a thickness from about 0.015 inches to about 0.125 inches.

9. The method of claim 1, wherein the fiber optic cable has a diameter from about 2 mm to about 26 mm.

10. The method of claim 1, wherein the fiber optic cable is a micro drop cable.

11. The method of claim 1, wherein the fiber optic cable is a micro sheath cable.

12. The method of claim 1, wherein the fiber optic cable is a blown fiber cable.

13. The method of claim 1, wherein the self-amalgamating tape is wrapped upon itself one or more times around the portion of the cable jacket to build up a surface between the cable jacket and the clamp.

14. A system, comprising:
   an enclosure;
   a kit for anchoring a fiber optic cable comprising:
      a strain relief bracket adapted to mount to the enclosure at a location and transfer axial load from the fiber optic cable to the enclosure;
      a clamp adapted to attach to the strain relief bracket; and
      a self-amalgamating tape, wherein the self-amalgamating tape is between the clamp and the fiber optic cable to provide a mechanical buffer, and wherein the self-amalgamating tape is adapted for exposure to temperatures in a range of about −40° C. to about 70° C.

15. The system of claim 14, wherein the self-amalgamating tape is a silicone tape.

16. The system of claim 14, wherein the self-amalgamating tape is fiber-reinforced.

17. The system of claim 14, wherein the self-amalgamating tape is a tape impregnated with a mesh substrate.

18. The system of claim 14, wherein the clamp is a radial clamp.

19. The system of claim 14, wherein the radial clamp is a circumferential clamp.

20. The system of claim 19, wherein the circumferential clamp is a hose clamp.

21. The system of claim 14, wherein the self-amalgamating tape is wrapped upon itself one or more times around a portion of the fiber optic cable to build up a surface between the fiber optic cable and the clamp.

\* \* \* \* \*